United States Patent
Han et al.

(10) Patent No.: US 8,411,987 B2
(45) Date of Patent: Apr. 2, 2013

(54) METHOD AND APPARATUS FOR CONTRAST ENHANCEMENT

(75) Inventors: Young Ran Han, Gyeonggi-do (KR); Seung Sin Lee, Gyeonggi-do (KR); Du-Sik Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1133 days.

(21) Appl. No.: 11/968,887

(22) Filed: Jan. 3, 2008

(65) Prior Publication Data

US 2008/0310752 A1 Dec. 18, 2008

(30) Foreign Application Priority Data

Jun. 13, 2007 (KR) .................. 10-2007-0057769

(51) Int. Cl.
*G06K 9/40* (2006.01)
*G06K 9/00* (2006.01)
*G09G 1/14* (2006.01)
*G09G 3/28* (2006.01)
*G09G 3/30* (2006.01)
*G09G 5/00* (2006.01)
*G09G 5/02* (2006.01)
*G09G 5/10* (2006.01)
*H04N 9/64* (2006.01)
*H04N 5/202* (2006.01)
*H04N 1/40* (2006.01)

(52) U.S. Cl. .......... 382/274; 382/162; 382/167; 345/20; 345/63; 345/77; 345/581; 345/596; 345/690; 348/251; 348/254; 358/461

(58) Field of Classification Search .......... None
See application file for complete search history.

(56) References Cited

U.S. PATENT DOCUMENTS

| 5,808,697 A * | 9/1998 | Fujimura et al. | 348/672 |
| 2004/0247199 A1* | 12/2004 | Murai et al. | 382/274 |
| 2006/0164524 A1 | 7/2006 | Shibano et al. | |

FOREIGN PATENT DOCUMENTS

| EP | 2 003 614 A3 | 1/2008 |
| JP | 09-065252 | 3/1997 |
| JP | 2004-302311 | 10/2004 |
| KR | 10-2007-0017391 | 2/2007 |

OTHER PUBLICATIONS

Zhao et al. "Automatic Digital Image Enhancement for Dark Pictures", 2006, IEEE ICASSP 2006, pp. 953-956.*
Bressan et al. "Local Contrast Enhancement", 2007, SPIE vol. 6493.*
European Office Action dated Aug. 4, 2010 and issued in corresponding European Patent Application 08150308.8.
Chinese Office Action, mailed Feb. 5, 2010, in Chinese Patent Application 200810080421.4.
Chinese Office Action, mailed Nov. 2, 2010, in Chinese Patent Application 200810080421.4.

* cited by examiner

*Primary Examiner* — Randolph I Chu
(74) *Attorney, Agent, or Firm* — Staas & Halsey LLP

(57) ABSTRACT

A method of enhancing a contrast and an apparatus for enhancing a contrast are provided. The method of enhancing the contrast includes: dividing an image into a plurality of blocks and calculating an average luminance value of each block; interpolating a peripheral luminance value for each input pixel of the image by using the average luminance value; and enhancing the contrast of the input pixel by using the interpolated peripheral luminance value of the input pixel and a unique luminance value of the input pixel.

35 Claims, 5 Drawing Sheets

METHOD AND APPARATUS FOR CONTRAST ENHANCEMENT

CROSS-REFERENCE TO RELATED APPLICATION

This application claims the benefit of Korean Patent Application No. 2007-0057769, filed on Jun. 13, 2007 in the Korean Intellectual Property Office, the disclosure of which is incorporated herein by reference.

BACKGROUND OF THE INVENTION

1. Field of the Invention

Aspects of the present invention relate to a method and apparatus of enhancing a contrast of an input image, and more particularly, to a method and apparatus of enhancing a contrast by increasing a luminance and decreasing the luminance depending on an area of an image.

2. Description of the Related Art

Generally, an image inputted by an image input apparatus has various information of an object, however, an element of a luminance signal is concentrated or distorted by a condition of the image input apparatus, and a characteristic of the object cannot be accurately expressed.

According to a conventional art, a dark image is brightened, and a bright image relatively emphasizes a dark area by variously processing an enhancement gain according to an image after analyzing the image in order to correct the distorted luminance signal.

In this instance, a brightness of the distorted image can be corrected. However, a brightness enhancement of the undistorted image may be omitted, and an original input signal value can be outputted as is. When the above-described conventional art is applied to a movie, a flickering phenomenon can be generated due to a enhancement gain difference between frames of the movie.

Also, according to a conventional art, an average brightness around an input pixel is calculated by using a sliding window or a low pass filter (LPF) in order to enhance a contrast. The peripheral brightness is calculated while the sliding window or a filter continuously overlaps input pixels In this instance, a window size or a filter size affects an algorithm performance. Because, the larger the window size or the filter size is, the more memory and processing time are needed. Thus, to enhance a image using the window or filter exist many restrictions on operating a real-time application.

Accordingly, a method and apparatus of enhancing a contrast by increasing a luminance and decreasing the luminance depending on an area of an image is needed.

SUMMARY OF THE INVENTION

Aspects of the invention provide a method and apparatus of enhancing a contrast of an input image which are not restricted by a memory and processing time by dividing an input image into a plurality of blocks and scanning all of the plurality of blocks once.

Other aspects of the invention also provide a method and apparatus of enhancing a contrast of an input image which can determine a luminance increase amount and a luminance decrease amount by using a correlation between a unique luminance value of an input pixel and a peripheral luminance value of the input pixel.

Additional aspects of the invention also provide a method and apparatus of enhancing a contrast of an input image which can separate a distorted pixel from an undistorted pixel by using a peripheral luminance value of an input pixel, and variously enhance a luminance for each pixel.

Additional aspects of the invention also provide a method and apparatus of enhancing a contrast of an input image which can increase a unique luminance value of an input pixel, and decrease the unique luminance value of the input pixel with reference to a luminance increase amount.

According to an aspect of the present invention, there is provided a method of enhancing a contrast, the method including: dividing an image into a plurality of blocks and calculating an average luminance value of each block; interpolating a peripheral luminance value for each input pixel of the image by using the average luminance value; and enhancing the contrast of the input pixel by using the interpolated peripheral luminance value of the input pixel and a unique luminance value of the input pixel.

In an aspect of the present invention, the enhancing includes: increasing the unique luminance value by using the unique luminance value of the input pixel and the peripheral luminance value of the input pixel; and decreasing the unique luminance value according to an increase amount of the unique luminance value.

In an aspect of the present invention, the interpolating includes: measuring a relative distance between center pixels of the plurality of blocks adjacent to the input pixel and the input pixel; and interpolating the peripheral luminance value for each input pixel by using a weight assigned according to the relative distance.

According to another aspect of the present invention, there is provided an apparatus for enhancing a contrast, the apparatus including: an average luminance value calculation unit to divide an image into a plurality of blocks and calculate an average luminance value of each block; a peripheral luminance value interpolation unit to interpolate a peripheral luminance value for each input pixel of the image by using the average luminance value; and a contrast enhancement unit to enhance the contrast of the input pixel by using the interpolated peripheral luminance value of the input pixel and a unique luminance value of the input pixel.

In an aspect of the present invention, the contrast enhancement unit includes: a unique luminance value increase unit to increase the unique luminance value by using the unique luminance value of the input pixel and the peripheral luminance value of the input pixel; and a unique luminance value decrease unit to decrease the unique luminance value according to an increase amount of the unique luminance value.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
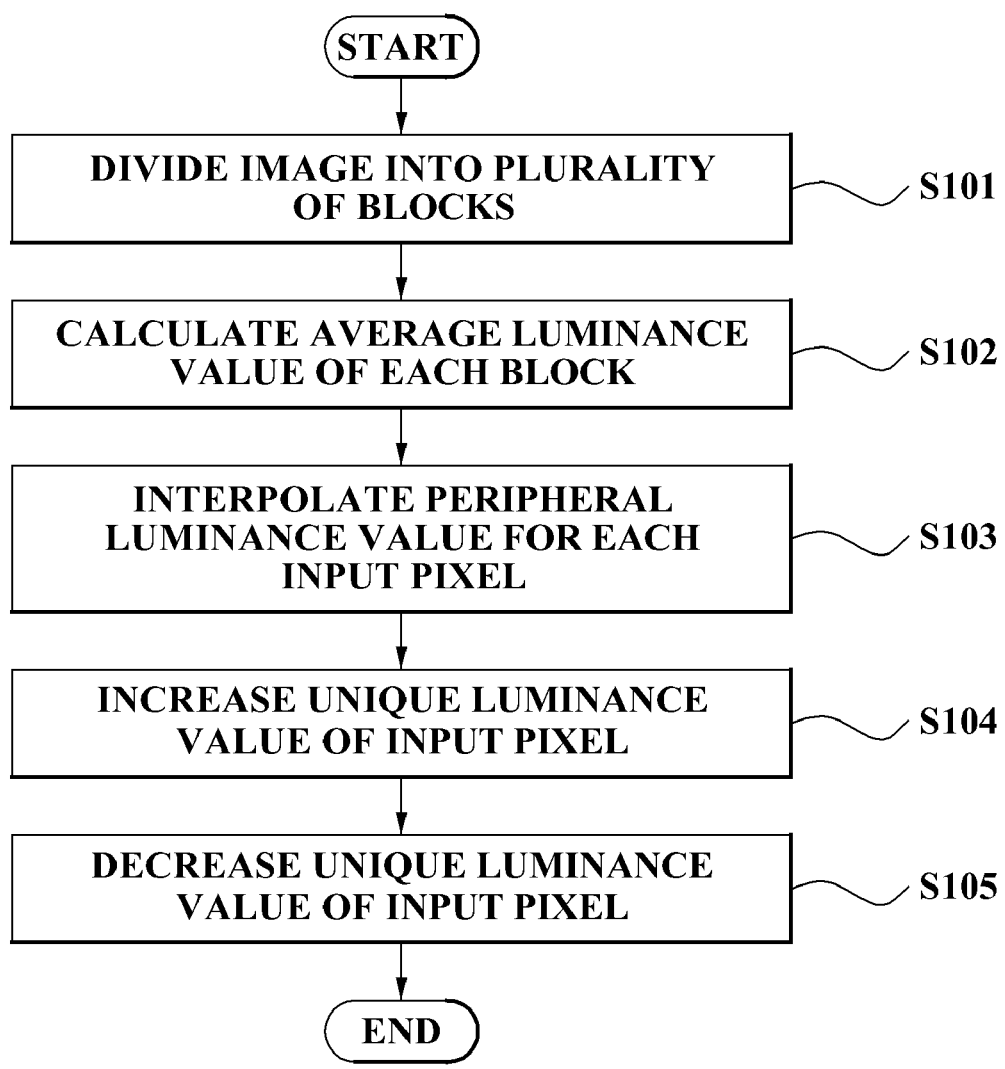
FIG. 1 is a flowchart illustrating a method of enhancing a contrast of an input image according to an embodiment of the present invention.

Reference will now be made in detail to present embodiments of the present invention, examples of which are illustrated in the accompanying drawings, wherein like reference numerals refer to the like elements throughout. The exemplary embodiments are described below in order to explain the present invention by referring to the figures.

FIG. 1 is a flowchart illustrating a method of enhancing a contrast of an input image according to an embodiment of the present invention.

Referring to FIG. 1, an inputted image is divided into a plurality of blocks in order to calculate an average luminance value in operation S101. In this instance, the input image can be divided into the plurality of blocks having an N×N size.

According to a conventional art, there is a limitation of increasing an N value due to a restriction of processing time and a memory. However, the N value can be variously established depending on the input image without the limitation in the present invention.

In operation S102, the average luminance value of each divided block of the input image is calculated. In this instance, the average luminance value of each block is calculated by using a process of scanning all input image frames once, different from a case of scanning the input image while a sliding window or a filter continuously overlaps input image.

Accordingly, since an entire input image is scanned once, processing time is reduced, and a number of memories corresponding to a number of divided blocks is needed. Therefore, the average luminance value of each block can be efficiently calculated. A method of dividing an entire input image into blocks and totally processing the image once can be more appropriate for a real-time application than a method of processing the image while the sliding window overlaps input image.

According to an embodiment of the present invention, a Look-Up Table (LUT) storing the calculated average luminance value of each block in an arrangement can be generated. An address designated in the arrangement of the LUT can be used for searching a block needed for processing the image. Specifically, a peripheral luminance value of the input pixel can be interpolated by using the average luminance value stored for each address of the arrangement.

In operation S103, the peripheral luminance value can be interpolated for each input pixel of the image by using the average luminance value calculated for each block. Specifically, a new pixel value can be generated for each location of all input pixels configuring the input image. In this instance, the peripheral luminance value is repeatedly interpolated in a location corresponding to all pixels of the input image.

Each pixel of the input image has the unique luminance value and the interpolated peripheral luminance value as a pair by using an interpolation. In this instance, the unique luminance is original luminance value of input pixel.

Thus, the present invention can enhance the contrast of the input pixel by using a correlation between the unique luminance value of the input pixel and the interpolated peripheral luminance value of the input pixel.

According to an embodiment of the present invention, the peripheral luminance value can be interpolated by using a weight determined by a linear method and the calculated average luminance value. A relative distance between a input pixel and each center pixel of blocks adjacent to the input pixel are measured. Here, the center pixel can have the average luminance value of the corresponding block, and be located in a center of the corresponding block.

The above-described interpolation method uses the weight determined by the linear method. In this instance, the weight can be inversely proportional to each of the relative distance between the center pixel and the input pixel. The peripheral luminance value can be interpolated by using a value of adding results of multiplying the average luminance value of each center pixel by each weight.

Figure 2:
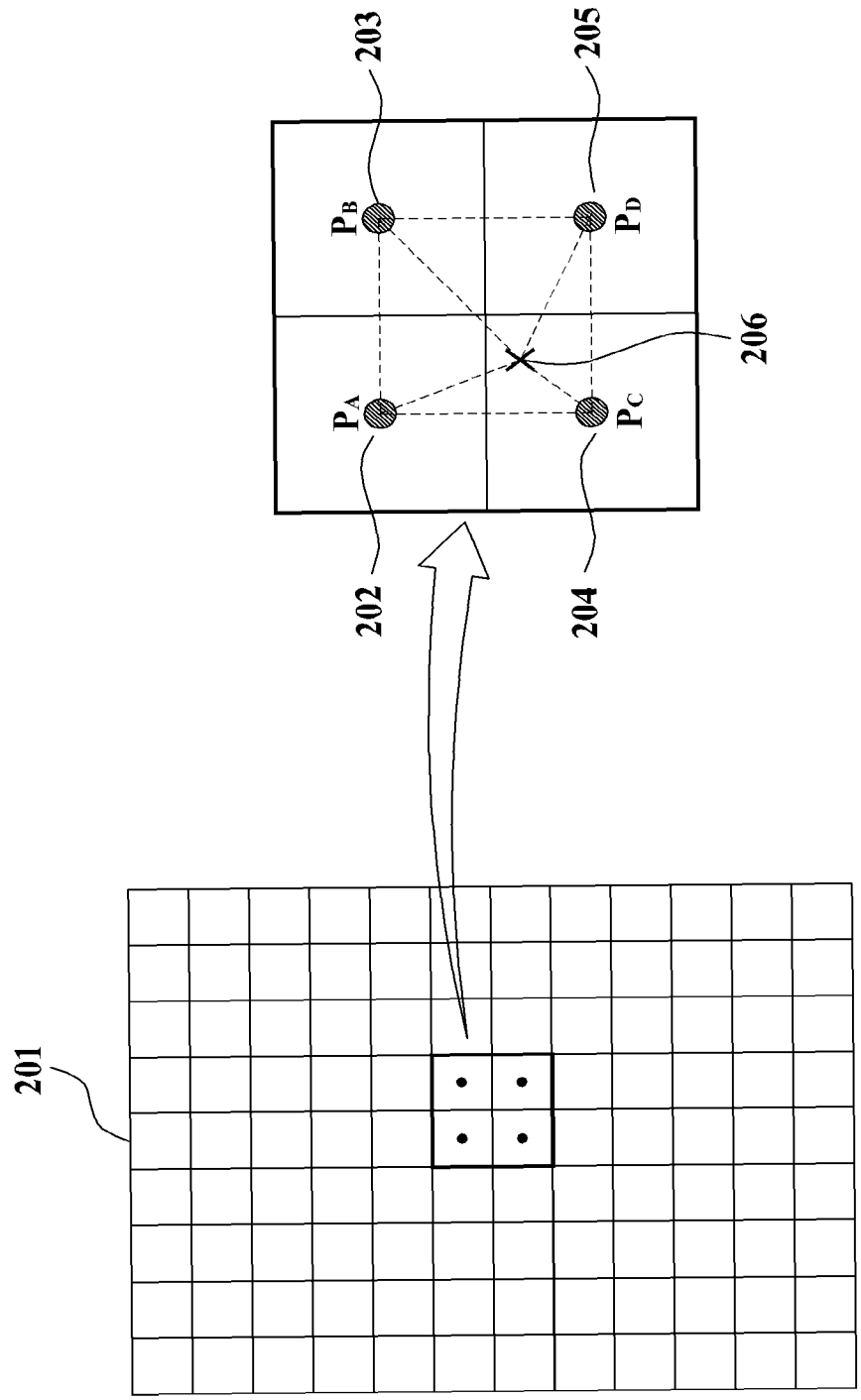
FIG. 2 illustrates a process of interpolating a peripheral luminance value of an input pixel by using center pixels of each block according to an embodiment of the present invention.

The above-described interpolating process shows an example of the simple linear interpolation, however, the present invention can use various interpolation methods such as nearest neighbor interpolation, bilinear interpolation, cubic interpolation, higher order interpolation, B-spline interpolation, and the like. FIG. 2 illustrates a process of interpolating a peripheral luminance of an input pixel by using a specific example.

In operation S104, the unique luminance value of the input pixel is increased by using the unique luminance value of the input pixel and the interpolated peripheral luminance value of the input pixel. In this instance, whether the corresponding input pixel is brighter or darker than the peripheral pixels can be determined by comparing the unique luminance value with the peripheral luminance value.

Specifically, when the unique luminance value is greater than the peripheral luminance value, it denotes that the input pixel is relatively brighter than the peripheral pixels. Also, when the unique luminance value is less than the peripheral luminance value, it denotes that the input pixel is relatively darker than the peripheral pixels.

Accordingly, when the input pixel is relatively brighter than the peripheral pixels, the unique luminance value of the input pixel can be sufficiently increased. Conversely, when the input pixel is relatively darker than the peripheral pixels, an increase amount of the unique luminance value of the input pixel can be decreased or be maintained as nearly zero.

Specifically, the unique luminance value of the input pixel is selectively increased according to the peripheral luminance value. Accordingly, a local contrast can be increased, and visibility of a dark area can be simultaneously improved.

According to an embodiment of the present invention, when unique luminance value of the input pixel is less than a midpoint value of all luminance gradations, the unique luminance value of the input pixel can be an object to increase.

However, when unique luminance value of the input pixel is greater than a midpoint value of all luminance gradations, the unique luminance value of the input pixel cannot be the object to increase, and an original value can be maintained.

Here, the midpoint value of all luminance gradations can be a value corresponding to a grade 128 of all luminance gradations having $2^8=256$ grades in the case of an 8-bit image. Specifically, when the unique luminance value of the input pixel exists in a low gradation area less than or equal to 128, the unique luminance value can be the object to increase.

Also, the increase amount of the unique luminance value can be actually very small or be nearly zero since the unique luminance value of the input pixel is less than the peripheral luminance value even though the unique luminance value of the input pixel exists in the low gradation area.

According to an embodiment of the present invention, when the unique luminance value exists in the low gradation area and is greater than the peripheral luminance value, the unique luminance value is increased according to a first luminance increase function. Conversely, when the unique luminance value exists in the low gradation area and is less than the peripheral luminance value, the unique luminance value is increased according to a second luminance increase function. Next, the increase amount of the unique luminance value is calculated by using each luminance increase function. A method of increasing the unique luminance value by using a luminance gradation curve corresponding to the luminance increase function is described in detail with reference to FIG. 3.

In operation S105, the unique luminance value of the input pixel is decreased according to the increase amount of the unique luminance value. Specifically, the unique luminance value can be decreased by using a contrast gamma gain of the input pixel calculated according to the increase amount of the unique luminance value.

The contrast gamma gain can be calculated by using a difference between a result of multiplying the increase amount of the unique luminance value by a predetermined decrease ratio and a contrast strength of the input pixel. In this instance, the contrast gamma gain is established as a threshold value when the contrast gamma gain has a value less than or equal to the threshold value. Here, the threshold value can be generally set as 1. The contrast gamma gain can be calculated by using Equation 1.

$$\text{Contrast\_g} = \text{Strength} + (\text{Ratio\_Bright}^2 \times -\text{Ratio\_Decrease})$$ [Equation 1]

If (Contrast_g>1.0)
Contrast_g=1.0, where Contrast_g denotes a contrast gamma gain, Strength denotes a contrast strength, Ratio_Bright denotes an increase amount of a unique luminance value, and Ratio_Decrease denotes a decrease ratio.

In this instance, the contrast gamma gain can be decreased down to the threshold value as the increase amount of the unique luminance value is increased. Conversely, the contrast gamma gain can be increased as the increase amount of the unique luminance value is decreased.

The unique luminance value can be decreased by using a gradation curve of the unique luminance value corresponding to the calculated contrast gamma gain of the input pixel. Here, the gradation curve of the unique luminance value according to the contrast gamma gain can be shown by using Equation $Y=X^g$, where Y denotes an output, X denotes an input, and g denotes a contrast gamma gain.

When the contrast gamma gain is equal to the threshold value 1, the luminance gradation curve in which an input value and an output value are equal can be generated. Also, when the contrast gamma gain is greater than 1, the gradation curve which is convex downwards can be generated. In this instance, since the output value corresponding to the specific input value is less than the output value when the contrast gamma gain is 1, the unique luminance value is decreased.

However, when the contrast gamma gain is less than 1, the luminance gradation curve becomes the gradation curve which is convex upwards. Accordingly, since the output value corresponding to the specific input value is greater than the output value when the contrast gamma gain is 1, the unique luminance value is increased.

Since operation S105 characteristically decreases or minimally maintains the unique luminance value, the contrast gamma gain can be established as the minimum threshold value 1 when the contrast gamma gain is less than 1. A process of decreasing the unique luminance value by using the contrast gamma gain is described in detail with reference to FIG. 4.

FIG. 2 illustrates a process of interpolating a peripheral luminance value of an input pixel by using center pixels of each block according to an embodiment of the present invention. The peripheral luminance value is interpolated for locations of all input pixels configuring an input image.

An input image 201 can be divided into the plurality of blocks having an equal size. Also, an average luminance value of each block can be calculated as described in operation S102. Here, since a number of blocks dividing a corresponding image is decreased as a size of each block is increased, a period of time of processing the image can be decreased as the size of each block is increased.

A center pixel $P_A$ 202, a center pixel $P_B$ 203, a center pixel $P_C$ 204, and a center pixel $P_D$ 205 are located in a center of a block adjacent to an input pixel 206. In this instance, the peripheral luminance value can be interpolated in a location of the input pixel 206 by using a weight being inversely proportional to a relative distance between center pixels and the input pixel. Here, luminance value of each of the center pixel $P_A$ 202, the center pixel $P_B$ 203, the center pixel $P_C$ 204, and the center pixel $P_D$ 205 can respectively be the average luminance value of the corresponding block.

For example, it can be assumed that the relative distances between the input pixel 206 and the center pixel $P_A$ 202, the center pixel $P_B$ 203, the center pixel $P_C$ 204, and the center pixel $P_D$ 205 are 3, 5, 1, and 4, respectively. Accordingly, the weight of the center pixel $P_A$ 202 is (5+1+4)/(1+3+4+5)=0.77, and the weight of the center pixel $P_B$ 203 is (1+3+4)/(1+3+4+5)=0.62. Also, the weight of the center pixel $P_C$ 204 is (3+4+5)/(1+3+4+5)=0.92, and the weight of the center pixel $P_D$ 205 is (1+3+5)/(1+3+4+5)=0.69. As describe above, since the weight is inversely proportional to the relative distance, it can be understood that the weight assigned to the center pixel $P_C$ 204 having the shortest relative distance is greatest.

Accordingly, the peripheral luminance value of the input pixel 206 is interpolated by using a value of adding results of multiplying the average luminance value of each center pixel by the calculated weight. The interpolation can be repeatedly performed for each pixel of the input image. The above-described example corresponds to an example of a linear interpolation, and the present invention is not limited thereto. The method of interpolating the peripheral luminance value can include various interpolation methods which perform an identical function.

Figure 3:
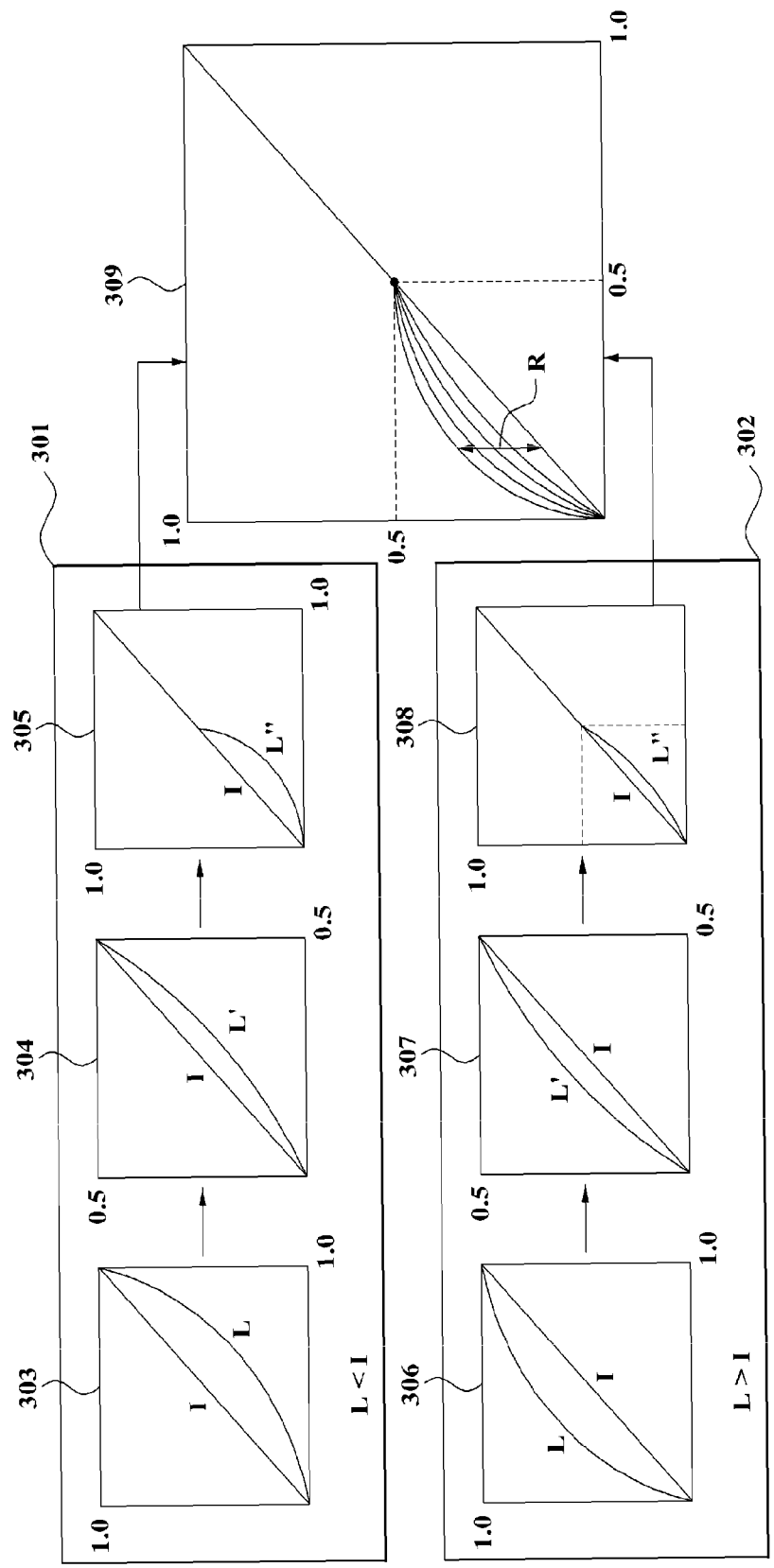
FIG. 3 illustrates a graph of increasing a unique luminance value of an input pixel by using the unique luminance value of the input pixel and a peripheral luminance value of the input pixel according to an embodiment of the present invention.

FIG. 3 illustrates a graph of increasing a unique luminance value of an input pixel by using the unique luminance value of the input pixel and a peripheral luminance value of the input pixel according to an embodiment of the present invention. Each graph of FIG. 3 denotes that a horizontal axis corresponds to an input value, and a perpendicular axis can correspond to an output value corresponding to the input value. Also, each graph can correspond to a gradation curve in which all luminance values are normalized to be between 0 and 1.

A process 301 denotes a process of increasing the unique luminance value by using a luminance gradation curve when the unique luminance value of the input pixel is greater than the interpolated peripheral luminance value. A process 302 denotes a process of increasing the unique luminance value by using the luminance gradation curve when the unique luminance value of the input pixel is less than the interpolated peripheral luminance value.

A graph 303 illustrates a gradation curve of the unique luminance value of the input pixel, that is, I, and a gradation curve of the interpolated peripheral luminance value L when the unique luminance value is greater than the peripheral luminance value. Referring to the graph 303, it can be understood that the output value corresponding to the identical input value in the gradation curve of the unique luminance value is greater than the output value in the gradation curve of the peripheral luminance value.

Conversely, a graph 306 illustrates a gradation curve of the unique luminance value of the input pixel, that is, I, and a gradation curve of the interpolated peripheral luminance value L when the unique luminance value is less than the peripheral luminance value. Referring to the graph 306, it can be understood that the output value corresponding to the identical input value in the gradation curve of the unique luminance value is less than the output value in the gradation curve of the peripheral luminance value.

A graph 304 is a graph of L' converted by using the unique luminance value I corresponding to a low gradation area, and the peripheral luminance value L when the unique luminance value is greater than the peripheral luminance value. Also, a graph 307 is a graph of L' converted by using the unique luminance value I corresponding to the low gradation area, and the peripheral luminance value L when the unique luminance value is less than the peripheral luminance value. Here, L' is converted by using Equation $L'=(I/L)+1$.

A graph 305 is a graph of L" acquired by using a first luminance increase function when the unique luminance value is greater than the peripheral luminance value. In this instance, the first luminance increase function can be defined as $L''=L'\times(1-L')+I^2$.

Also, a graph 308 is a graph of L" acquired by using a second luminance increase function when the unique luminance value is less than the peripheral luminance value. In this instance, the second luminance increase function can be defined as $L''=L'(1+(L-I)-L')+I^2$. Comparing the graph 305 with the graph 308, it can be understood that a difference between L" and the unique luminance value when the unique luminance value is greater than the peripheral luminance value is greater than a difference between L" and the unique luminance value when the unique luminance value is less than the peripheral luminance value.

A graph 309 is a graph of inverse-transforming the graph 305 and the graph 308, and denotes a luminance increase curve of the unique luminance value. R denotes an increase amount of the unique luminance value. In this instance, the increase amount R can be acquired by using Equation $R=I/L''$.

Accordingly, as the unique luminance value exists in the low gradation area (<0.5) and the difference between the unique luminance value and the peripheral luminance value is increased, the luminance increase curve becomes more convex upwards. Thus, as the luminance increase curve becomes more convex upwards, it denotes that the increase amount of the unique luminance value is increased.

When the unique luminance value of the input pixel exists in the low gradation area, and is greater than the interpolated peripheral luminance value, that is, I>L, it can be understood that the increase amount of the unique luminance value is greater than the increase amount of the unique luminance value when the unique luminance value of the input pixel is less than the interpolated peripheral luminance value, that is, L>I. Specifically, it can be understood that the luminance increase amount is greater when the input pixel located in the dark area corresponding to the low gradation area is relatively brighter than a peripheral pixel. Conversely, it can be understood that the luminance increase amount is very small or nearly zero when the input pixel located in the low gradation area is relatively darker than the peripheral pixel.

Visibility can be improved in a distorted portion such as a shadow. Also, when the input pixel corresponding to the low gradation area is relatively brighter than surrounding pixels, the input pixel is more greatly brightened, and the contrast can be locally enhanced. Also, it can be understood that the unique luminance value of the input pixel is variously increased depending on a brightness of the input pixel and the brightness of the peripheral pixel.

Figure 4:
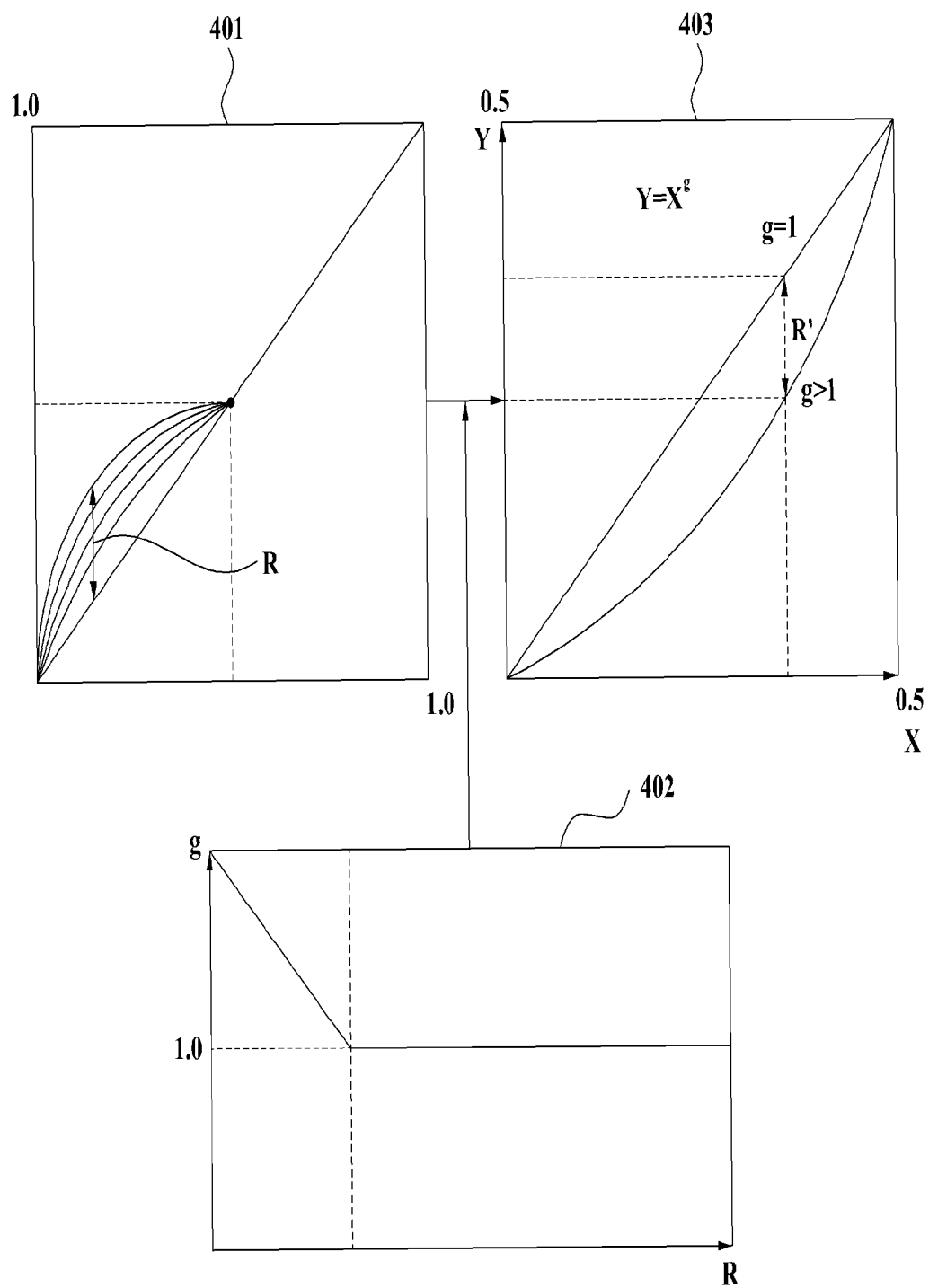
FIG. 4 illustrates a graph of decreasing a unique luminance value with reference to an increase amount of the unique luminance value according to an embodiment of the present invention.

FIG. 4 illustrates a graph of decreasing a unique luminance value with reference to an increase amount of the unique luminance value according to an embodiment of the present invention.

It is described with reference to FIG. 3 that the unique luminance value of the input pixel existing in the low gradation area corresponding to a shadow area is increased according to the peripheral luminance value. Here, the unique luminance value of the pixel in which the unique luminance value is not increased or the increase amount is small can be decreased by using the increase amount of the unique luminance value of the shadow area. Specifically, a contrast can be relatively enhanced by decreasing the unique luminance value of the input pixel having the small increase amount of the unique luminance value.

A graph 401 is a graph identical to the graph 309. Specifically, it can be understood that the unique luminance value is significantly increased, or is very slightly increased according to the peripheral luminance value when the unique luminance value of the input pixel corresponds to the low gradation area (<0.5). Here, the unique luminance value of the input pixel having the small increase amount can be decreased by using the increase amount of the unique luminance value, that is, R.

A graph 402 denotes a graph illustrating a contrast gamma gain changed according to the increase amount of the unique luminance value. A horizontal axis R of the graph 402 denotes an increase amount of a unique luminance value, and a perpendicular axis g denotes a contrast gamma gain.

Referring to the graph 402, it can be understood that the contrast gamma gain is decreased as the increase amount of the unique luminance value is increased in an area less than a predetermined value R. A contrast gamma gain curve can correspond to Equation 1. Specifically, the contrast gamma gain can be acquired by using a difference between a result of multiplying the increase amount of the unique luminance value by a predetermined decrease ratio and a contrast strength of the input pixel.

In this instance, it can be understood that the contrast gamma gain is not further decreased, and is continuously maintained as 1.0 when the increase amount of the unique luminance value is greater than or equal to a predetermined value. Specifically, it can denote that the contrast gamma gain is established as a threshold value when the contrast gamma gain is calculated as a value less than or equal to the threshold value 1.0 by using Equation 1.

A graph 403 illustrates a gradation curve of the unique luminance value in the low gradation area according to the contrast gamma gain. Actually, the unique luminance value of the input pixel is not decreased in a high gradation area.

When an input value of the unique luminance value is X, and an output value of the unique luminance value is Y, the gradation curve of the unique luminance value according to the contrast gamma gain g can be in accordance with Equation $Y=X^g$. It can be understood that as g is increased, the curve becomes convex downwards, and R' denoting a decrease degree of the unique luminance value is increased.

However, as g is decreased, the gradation curve becomes convex upwards. However, since decreasing the unique luminance value is a goal, g cannot have a value less than the threshold value 1.0. It can be understood that when g has the threshold value 1.0, the unique luminance value is not decreased, and the output value equal to the input value is calculated.

Specifically, a luminance increase effect is great in an area such as a shadow area, and the like, in which brightness information is distorted. Conversely, a general area which is very bright or is undistorted maintains an original signal, and the contrast cannot be enhanced. Accordingly, when the increase amount of the unique luminance value of the input pixel is small or nearly zero, a contrast value can be enhanced by decreasing the unique luminance value.

Figure 5:
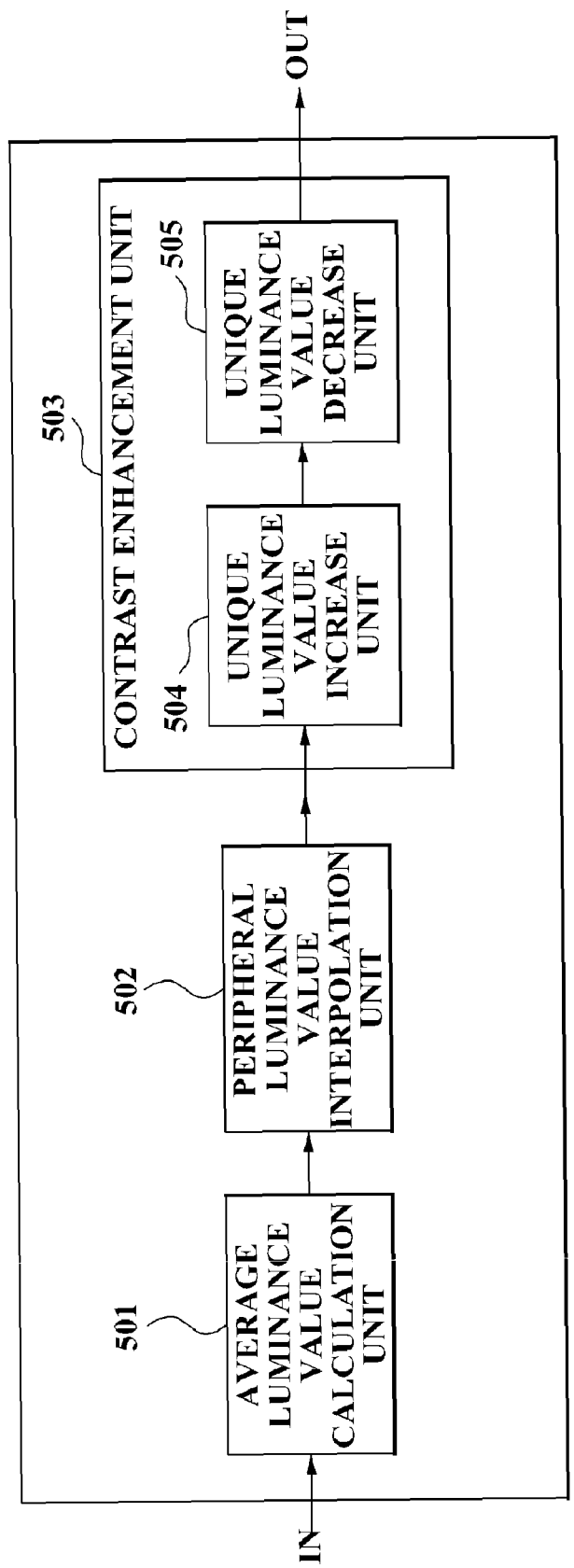
FIG. 5 is a diagram illustrating an apparatus for enhancing a contrast of an input image according to an embodiment of the present invention.

FIG. 5 is a diagram illustrating an apparatus for enhancing a contrast of an input image according to an embodiment of the present invention. The apparatus for enhancing the contrast can be operated by using the method of enhancing the contrast according to an embodiment of the present invention.

The apparatus for enhancing the contrast can include an average luminance value calculation unit 501, a peripheral luminance value interpolation unit 502, and a contrast enhancement unit 503. In this instance, the contrast enhancement unit 503 includes a unique luminance value increase unit 504 and a unique luminance value decrease unit 505.

The average luminance value calculation unit 501 can divide an inputted image into a plurality of blocks and calculate an average luminance value of each block. In this instance, the average luminance value of each block can be calculated by scanning all of the divided plurality of blocks once. The method of enhancing the contrast according to the present invention reduces operating time more greatly than a method of scanning an input image while a sliding window or a filter overlaps input image, and only a number of memories corresponding to a number of blocks is needed.

Also, the average luminance value calculation unit 501 can optionally include an LUT generation unit to generate an LUT previously storing the average luminance value of each block in an arrangement in order to reduce a number of calculation times of the average luminance value. Accordingly, the peripheral luminance value of the input pixel can be interpolated by using the average luminance value stored in the arrangement of the LUT.

The peripheral luminance value interpolation unit 502 can interpolate a peripheral luminance value for each input pixel by using the average luminance value of each block. A process of interpolating the peripheral luminance value is described below. The peripheral luminance value interpolation unit 502 measures a relative distance between center pixels of the plurality of blocks adjacent to the input pixel and the input pixel.

Also, the peripheral luminance value interpolation unit 502 can interpolate the peripheral luminance value for each input pixel by assigning a weight being inversely proportional to the measured relative distance, and multiplying the weight by the average luminance value of each center pixel. In this instance, the center pixel has the average luminance value of each block of the plurality of blocks adjacent to the input pixel, and is located in a center of each block of the plurality of blocks.

The unique luminance value increase unit 504 can increase the unique luminance value of the input pixel by using a correlation between the unique luminance value of the input pixel and the peripheral luminance value of the input pixel. The unique luminance value increase unit 504 can increase the unique luminance value according to a first luminance increase function when the unique luminance value exists in a low gradation area and is greater than the interpolated peripheral luminance value.

The unique luminance value increase unit 504 can increase the unique luminance value according to a second luminance increase function when the unique luminance value exists in the low gradation area and is less than the interpolated peripheral luminance value. A detailed process of increasing the unique luminance value according to the first luminance increase function and the second luminance increase function is described above with reference to FIG. 3.

The unique luminance value increase unit 504 can calculate an increase amount of the unique luminance value. When the unique luminance value exists in the low gradation area and is greater than the peripheral luminance value, the increase amount of the unique luminance value is greater than the increase amount of the unique luminance value when the unique luminance value is less than the peripheral luminance value.

Specifically, the unique luminance value of the input pixel, which exists in the low gradation area and is located in an area relatively brighter than a surrounding pixels, can be more greatly increased than the unique luminance value of the input pixel which exists in the low gradation area and is located in an area relatively darker than the surrounding pixels.

Accordingly, visibility of a distorted portion such as a shadow can be improved. However, the increase amount of the unique luminance value can be small or nearly zero when the unique luminance value of the input pixel is almost equal to the surrounding pixels or it is relatively darker than the surrounding pixels.

The unique luminance value decrease unit 505 can decrease the unique luminance value of the input pixel in which the increase amount of the unique luminance value passing through the unique luminance value increase unit 504 is small or nearly zero.

The unique luminance value decrease unit 505 can calculate a contrast gamma gain of the input pixel according to the increase amount of the unique luminance value, and decrease the unique luminance value by using the contrast gamma gain. In this instance, the contrast gamma gain is calculated by using a difference between a result of multiplying the increase amount of the unique luminance value by a predetermined decrease ratio and a contrast strength of the input pixel. Specifically, the contrast gamma gain can be calculated by using the above-described Equation 1.

The contrast gamma gain can be established as a threshold value when the contrast gamma gain has a value less than or equal to the threshold value. The threshold value is generally established as 1. Here, when the contrast gamma gain is less than 1, a luminance gradation curve becomes convex upwards and becomes a luminance increase curve. When the contrast gamma gain is less than 1, the contrast gamma gain is established as the threshold value.

The unique luminance value decrease unit 505 can determine a decrease amount of the unique luminance value by determining a gradation curve of the unique luminance value corresponding to the calculated contrast gamma gain. As the increase amount of the unique luminance value is increased, the input pixel can be considered as distorted. Since a correction of the distortion is previously performed by using the unique luminance value increase unit 504, the input pixel having the greatest increase amount of the luminance value has the decrease amount of the luminance value which is relatively small, or is nearly zero.

Conversely, when the increase amount of the unique luminance value calculated by using the unique luminance value increase unit 504 is small, the input pixel can be considered as being located in an undistorted and normal area. The unique luminance value decrease unit 505 can enhance a contrast of a local area by decreasing the unique luminance value of the input pixel. Specifically, the decrease amount of the unique luminance value is increased in the input pixel having the small increase amount of the unique luminance value. Accordingly, the unique luminance value of the input pixel is decreased, and an effect of relatively enhancing a local contrast is shown.

Specifically, each different brightness conversion function can be applied for each pixel by separating information distorted in the input image from information undistorted in the input image. Accordingly, since a difference between a bright area and a dark area is increased, an entire contrast can be enhanced. The luminance value of the distorted image is restored, and the contrast of the undistorted image is emphasized.

The method of enhancing the contrast according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

According to the above-described exemplary embodiments of the present invention, there is provided a method and apparatus of enhancing a contrast of an input image which are not restricted by a memory and processing time by dividing an input image into a plurality of blocks and scanning all of the plurality of blocks once.

Also, according to the above-described exemplary embodiments of the present invention, there is provided a method and apparatus of enhancing a contrast of an input image which can determine a luminance increase amount and a luminance decrease amount by using a correlation between a unique luminance value of an input pixel and a peripheral luminance value of the input pixel.

Also, according to the above-described exemplary embodiments of the present invention, there is provided a method and apparatus of enhancing a contrast of an input image which can separate a distorted pixel from an undistorted pixel by using a peripheral luminance value of an input pixel, and variously enhance a luminance for each pixel.

Also, according to the above-described exemplary embodiments of the present invention, there is provided a method and apparatus of enhancing a contrast of an input image which can increase a unique luminance value of an input pixel, and decrease the unique luminance value of the input pixel with reference to a luminance increase amount.

Although a few embodiments of the present invention have been shown and described, it would be appreciated by those skilled in the art that changes may be made to these embodiments without departing from the principles and spirit of the invention, the scope of which is defined by the claims and their equivalents.

What is claimed is:

1. A method of enhancing a contrast, the method comprising:
   dividing an image into a plurality of blocks and calculating an average luminance value of each block;
   interpolating a peripheral luminance value for each input pixel of the image by using the average luminance value; and
   enhancing the contrast of the input pixel by using the interpolated peripheral luminance value of the input pixel and a unique luminance value of the input pixel, wherein the enhancing comprises:
   increasing the unique luminance value by using the unique luminance value of the input pixel and the peripheral luminance value of the input pixel; and
   decreasing the unique luminance value according to an increase amount of the unique luminance value.

2. The method of claim 1, wherein the dividing of the image and calculating of the average luminance value calculates the average luminance value by scanning all of the divided plurality of blocks once.

3. The method of claim 1, wherein the dividing of the image and calculating of the average luminance value generates a Look-Up Table (LUT) storing the average luminance value of each block in an arrangement.

4. The method of claim 3, wherein the interpolating interpolates the peripheral luminance value by using the average luminance value stored in the arrangement of the LUT.

5. The method of claim 1, wherein the interpolating comprises:
   measuring a relative distance between center pixels of the plurality of blocks adjacent to the input pixel and the input pixel; and
   interpolating the peripheral luminance value for each input pixel by using a weight assigned according to the relative distance.

6. The method of claim 5, wherein the center pixel has the average luminance value of each block of the plurality of blocks adjacent to the input pixel, and is located in a center of each block of the plurality of blocks.

7. The method of claim 6, wherein the interpolating interpolates the peripheral luminance value by using a value of adding results of multiplying the average luminance value of each center pixel by a weight being inversely proportional to the relative distance.

8. The method of claim 1, wherein the increasing comprises:
   increasing the unique luminance value according to a first luminance increase function when the unique luminance value is greater than the peripheral luminance value;
   increasing the unique luminance value according to a second luminance increase function when the unique luminance value is less than the peripheral luminance value; and
   calculating an increase amount of the unique luminance value by using any one of the first luminance increase function and the second luminance increase function.

9. The method of claim 8, wherein the increasing of the unique luminance value according to the any one of the first and second luminance increase function increases the unique luminance value when the unique luminance value is less than a midpoint value of an entire luminance gradation, and maintains the unique luminance value when the unique luminance value is greater than the midpoint value of the entire luminance gradation.

10. The method of claim 8, wherein the first luminance increase function is $$L''=L'\times(1-L')+I^2,$$

where L'=(I/L)+1, I denotes a unique luminance value normalized to be between 0 and 1, and L denotes a peripheral luminance value normalized to be between 0 and 1.

11. The method of claim 8, wherein the second luminance increase function is $$L''=L'\times(1+(L-1)-L')+I^2,$$

where L'=(I/L)+1, I denotes a unique luminance value normalized to be between 0 and 1, and L denotes a peripheral luminance value normalized to be between 0 and 1.

12. The method of claim 10, wherein the calculating of the increase amount calculates the increase amount according to the unique luminance value and a ratio of L" corresponding to the unique luminance value.

13. The method of claim 1, wherein the decreasing comprises:
calculating a contrast gamma gain of the input pixel according to the increase amount of the unique luminance value; and
decreasing the unique luminance value by using the contrast gamma gain.

14. The method of claim 13, wherein the calculating of the contrast gamma gain calculates the contrast gamma gain by using a difference between a result of multiplying the increase amount by a predetermined decrease ratio and a contrast strength of the input pixel, and
the contrast gamma gain is established as a threshold value when the contrast gamma gain has a value less than or equal to the threshold value.

15. The method of claim 14, wherein the calculating of the contrast gamma gain decreases the contrast gamma gain down to the threshold value as the increase amount is increased.

16. The method of claim 13, wherein the decreasing decreases the unique luminance value by using a gradation curve of the unique luminance value according to the calculated contrast gamma gain.

17. A non-transitory computer-readable recording medium storing a program for implementing a method of enhancing a contrast, the method comprising:
dividing an image into a plurality of blocks and calculating an average luminance value of each block;
interpolating a peripheral luminance value for each input pixel of the image by using the average luminance value; and
enhancing the contrast of the input pixel by using the interpolated peripheral luminance value of the input pixel and a unique luminance value of the input pixel, wherein the enhancing comprises:
increasing the unique luminance value by using the unique luminance value of the input pixel and the peripheral luminance value of the input pixel; and
decreasing the unique luminance value according to an increase amount of the unique luminance value.

18. An apparatus for enhancing a contrast, the apparatus comprising:
an average luminance value calculation unit to divide an image into a plurality of blocks and calculate an average luminance value of each block;
a peripheral luminance value interpolation unit to interpolate a peripheral luminance value for each input pixel of the image by using the average luminance value; and
a contrast enhancement unit to enhance the contrast of the input pixel by using the interpolated peripheral luminance value of the input pixel and a unique luminance value of the input pixel, wherein the contrast enhancement unit comprises:
a unique luminance value increase unit to increase the unique luminance value by using the unique luminance value of the input pixel and the peripheral luminance value of the input pixel; and
a unique luminance value decrease unit to decrease the unique luminance value according to an increase amount of the unique luminance value.

19. The apparatus of claim 18, wherein the average luminance value calculation unit calculates the average luminance value by scanning all of the divided plurality of blocks once.

20. The apparatus of claim 18, wherein the average luminance value calculation unit comprises:
an LUT generation unit to generate an LUT storing the average luminance value of each block in an arrangement.

21. The apparatus of claim 20, wherein the peripheral luminance value interpolation unit interpolates the peripheral luminance value by using the average luminance value stored in the arrangement of the LUT.

22. The apparatus of claim 18, wherein the peripheral luminance value interpolation unit measures a relative distance between center pixels of the plurality of blocks adjacent to the input pixel and the input pixel, and interpolates the peripheral luminance value for each input pixel by using a weight assigned according to the relative distance.

23. The apparatus of claim 22, wherein the center pixel has the average luminance value of each block of the plurality of blocks adjacent to the input pixel, and is located in a center of each block of the plurality of blocks.

24. The apparatus of claim 23, wherein the peripheral luminance value interpolation unit interpolates the peripheral luminance value by using a value of adding results of multiplying the average luminance value of each center pixel by a weight being inversely proportional to the relative distance.

25. The apparatus of claim 18, wherein the unique luminance value increase unit increases the unique luminance value according to a first luminance increase function when the unique luminance value is greater than the peripheral luminance value,
increases the unique luminance value according to a second luminance increase function when the unique luminance value is less than the peripheral luminance value, and
calculates an increase amount of the unique luminance value by using any one of the first luminance increase function and the second luminance increase function.

26. The apparatus of claim 25, wherein the unique luminance value increase unit increases the unique luminance value when the unique luminance value is less than a midpoint value of an entire luminance gradation, and maintains the unique luminance value when the unique luminance value is greater than the midpoint value of the entire luminance gradation.

27. The apparatus of claim 25, wherein the first luminance increase function is $$L''=L'\times(1-L')+I^2,$$

where L'=(I/L)+1, I denotes a unique luminance value normalized to be between 0 and 1, and L denotes a peripheral luminance value normalized to be between 0 and 1.

28. The apparatus of claim 25, wherein the second luminance increase function is $$L''=L'\times(1+(L-I)-L')+I^2,$$

where L'=(I/L)+1, I denotes a unique luminance value normalized to be between 0 and 1, and L denotes a peripheral luminance value normalized to be between 0 and 1.

29. The apparatus of claim 27, wherein the increase amount is calculated according to the unique luminance value and a ratio of L" corresponding to the unique luminance value.

30. The apparatus of claim 18, wherein the unique luminance value decrease unit calculates a contrast gamma gain of the input pixel according to the increase amount of the unique luminance value, and decreases the unique luminance value by using the contrast gamma gain.

31. The apparatus of claim 30, wherein the contrast gamma gain is calculated by using a difference between a result of multiplying the increase amount by a predetermined decrease ratio and a contrast strength of the input pixel, and is established as a threshold value when the contrast gamma gain has a value less than or equal to the threshold value.

32. The apparatus of claim 31, wherein the contrast gamma gain is decreased down to the threshold value as the increase amount is increased.

33. The apparatus of claim 30, wherein the unique luminance value decrease unit decreases the unique luminance value by using a gradation curve of the unique luminance value according to the calculated contrast gamma gain.

34. The method of claim 11, wherein the calculating of the increase amount calculates the increase amount according to the unique luminance value and a ratio of L" corresponding to the unique luminance value.

35. The apparatus of claim 28, wherein the increase amount is calculated according to the unique luminance value and a ratio of L" corresponding to the unique luminance value.

* * * * *